(12) United States Patent
Chiculita et al.

(10) Patent No.: US 10,049,095 B2
(45) Date of Patent: Aug. 14, 2018

(54) IN-CONTEXT EDITING OF OUTPUT PRESENTATIONS VIA AUTOMATIC PATTERN DETECTION

(71) Applicant: Adobe Systems Incorporated, San Jose, CA (US)

(72) Inventors: Alexandru Chiculita, San Francisco, CA (US); Alexandru Costin, Bucharest (RO)

(73) Assignee: Adobe Systems Incorporated, San Jose, CA (US)

( * ) Notice: Subject to any disclaimer, the term of this patent is extended or adjusted under 35 U.S.C. 154(b) by 1184 days.

(21) Appl. No.: 13/752,682

(22) Filed: Jan. 29, 2013

(65) Prior Publication Data

US 2014/0215306 A1  Jul. 31, 2014

(51) Int. Cl.
*G06F 17/24* (2006.01)

(52) U.S. Cl.
CPC .................................. *G06F 17/248* (2013.01)

(58) Field of Classification Search
CPC .................................. G06F 17/24; G06F 17/21
See application file for complete search history.

(56) References Cited

U.S. PATENT DOCUMENTS

| | | | |
|---|---|---|---|
| 6,026,433 A | 2/2000 | D'arlach et al. | |
| 8,042,036 B1* | 10/2011 | Sharma | G06F 17/30882 |
| | | | 715/208 |
| 2003/0204810 A1 | 10/2003 | Dam et al. | |
| 2007/0067714 A1 | 3/2007 | Lin | |
| 2007/0162845 A1 | 7/2007 | Cave et al. | |
| 2008/0313260 A1 | 12/2008 | Sweet et al. | |
| 2008/0313532 A1* | 12/2008 | Dames | G06F 17/2247 |
| | | | 715/239 |
| 2009/0031225 A1* | 1/2009 | Toebes et al. | 715/760 |
| 2013/0019189 A1* | 1/2013 | Stewart et al. | 715/760 |
| 2013/0174019 A1* | 7/2013 | Braud et al. | 715/234 |

OTHER PUBLICATIONS

Borodin et al., "WebVAT: Web Page Visualization and Analysis Tool", Web Engineering, Proceedings 4607:516-520, 2007.

* cited by examiner

*Primary Examiner* — Scott Baderman
*Assistant Examiner* — Seung Jung
(74) *Attorney, Agent, or Firm* — Kilpatrick Townsend & Stockton LLP (57) ABSTRACT

Systems and methods are provided for in-context editing of websites and other output presentations via automatic pattern detection. One embodiment involves an editor application receiving an output presentation. The output presentation is generated based on at least one source element from at least one source file. The editor application identifies at least one pattern among multiple output elements in the output presentation. The at least one pattern corresponds to the at least one source element. The editor application determines a modification to the source element corresponding to a modification to at least one of the output elements. The modification to the source element is determined based on identifying the at least one pattern. The editor application applies the corresponding modification to the at least one source element responsive to receiving the modification to the at least one output elements.

20 Claims, 6 Drawing Sheets

IN-CONTEXT EDITING OF OUTPUT PRESENTATIONS VIA AUTOMATIC PATTERN DETECTION

TECHNICAL FIELD

This disclosure relates generally to computer-implemented methods and systems and more particularly relates to in-context editing of websites and other output presentations via automatic pattern detection.

BACKGROUND

A software engine may generate a website to be rendered by an Internet browser application by combining data from difference source files, such as a template file and data from a data source. For example, a template file may define the layout and the visual appearance of the pages of the website, such as the layout for each page in an online book-purchasing website. Template files may also include references to data sources, such as databases, that include data for populating each web page, such as a database of books to be sold via the website. A software engine executed at a web server or other computing system may dynamically generate one or more output files, such as hypertext markup language ("HTML") files, that include the template along with data retrieved from the data source.

Prior solutions for creating a website require multiple steps. For example, a graphics designer creates an image representing a layout and/or style for the website. An interactive designer then converts the image into one or more HTML files. A web developer then uses a template to frame all of the separate web pages within a website. Framing a website may include maintaining a consistent header, footer and overall appearance for each page of the website.

A deficiency of this process is that modifying some aspect of the website in an earlier step in the process, such as modifying an image used to provide the layout of a website, requires corresponding modifications in one or more of the subsequent steps, such as converting the image to HTML and framing the web pages of the website. Thus, prior solutions for modifying the layout or content of a website, such as changing the style of a website after the interactive designer has converted the image into one or more HTML files, involve inefficiencies in workflow. Another deficiency is that such prior solutions may require creative professionals, such as graphic designers, to be knowledgeable regarding web development tools such as HTML and cascading style sheets ("CSS"). In addition, prior solutions for in-context website development tools do not allow a designer to modify source code for templates files by modifying a rendered web page.

SUMMARY

One embodiment involves receiving an output presentation. The output presentation is generated based on at least one source element from at least one source file. The embodiment further involves identifying at least one pattern among multiple output elements in the output presentation. The at least one pattern corresponds to the at least one source element. The embodiment further involves determining a modification to the source element corresponding to a modification to at least one of the output elements. The modification to the source element is determined based on identifying the at least one pattern. The embodiment further involves applying the corresponding modification to the at least one source element responsive to receiving the modification to the at least one output elements.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings, where.

DETAILED DESCRIPTION

Computer-implemented systems and methods are disclosed for providing in-context editing of websites and other output presentations via automatic pattern detection. An editor application can analyze a web page or other output presentation as the web page is rendered in a browser application or other suitable application. The editor application can identify patterns in the web page that correspond to elements in a source file used to generate the web page, such as the template specifying the layout for the web page or data for a data source in a web page. The patterns may be identified independently of any elements of the web page being tagged or otherwise delineated as corresponding to elements of a source file. The editor application can thus automatically recognize template patterns or other patterns in the output web page that can be edited. Automatically recognizing such patterns may obviate the need to include special code in a template, such as tags or other metadata, specifically delineating the editable regions of a template.

The following non-limiting example is provided to help introduce the general subject matter of certain embodiments. An editor application may access a web page at EXAMPLE_XYZ.com. As rendered by a browser application, the web page may include output elements provided by hypertext markup language ("HTML") code. The HTML code may be generated by accessing a template file specifying a layout for the web page, accessing a data source including data to be included in the web page, and generating the HTML code that includes the data organized as specified by the layout. The output elements of the web page specified by HTML code may not include any tags or other metadata identifying the source layout file or data source used to generate the HTML code. For example, a web page generated when an Internet browser accesses the site EXAM- PLE_XYZ.com may display a novel to be purchased, where the data about the novel is obtained from a database and the manner of displaying the data is specified in a layout file. The editor application may identify patterns in the output elements of the web page indicative of the template file, such as layout elements in the web page, or indicative of the data source, such as data being displayed in the web page in a manner indicative of a record in a database. The editor application can receive input modifying the web page, such as modifying a title of a novel. The editor application can determine that the modification to the title of the novel as displayed in the web page corresponds to modifying a record for the novel in the database. The editor application can cause the database to be modified to reflect the modification to the web page.

In accordance with one embodiment, an editor application receives an output presentation. The output presentation is generated based on at least one source element from at least one source file. A non-limiting example of an output presentation includes one or more web pages of a website. Non-limiting examples of source files include layout files or other template files and databases or other data sources. The editor application identifies at least one pattern among multiple output elements in the output presentation. The identified pattern corresponds to the at least one source element. For example, the editor application may identify a pattern, such a grid layout for organizing content to be displayed in the web page, by analyzing the placement of content on the web page. The editor application may determine that the grid layout of content as displayed in the web page corresponds to a layout file. The editor application determines a modification to the source element corresponding to a modification to at least one of the output elements. The modification to the source element is determined based on identifying the at least one pattern. For example, the editor application may determine that repositioning different columns in a web page corresponds to modifying corresponding source code of a layout file or that modifying text in a field of a web page corresponds to performing a function call modifying a corresponding source record in a source database. The editor application can thus automatically "reverse engineer" which modifications to the source layout file correspond to a modification in the web page. The editor application applies the corresponding modification to the at least one source element responsive to receiving the modification to the at least one output elements.

The editor application can use any suitable process or technique for identifying a data source used to generate a web page based on analyzing the web page. In some embodiments, each web page can include contextual global variables and/or functions that can be used to access data from a data source. Template files can be used to access the global variables and/or functions and obtain generated output data. For example, the editor application may identify a client currently logged into the web site to edit the web page via a function such as "User.getActiveUser ( )" specified in a template file. The function can return a data structure that includes information about the logged-in client as well as a link to a corresponding record for the client in a database. The link to the database can be used to apply changes to a web page made by the client via the editor application. For example, the editor application can access a record of the template file being used to output the name of a logged-in client along with a record of a link to the database including the client record for the user. The editor application can access the record via the link.

As used herein, the term "output presentation" is used to refer to one or more output files to be rendered or otherwise used to display content at a computing device and generated from one or more source files. Generating an output presentation may involve extracting portions of data from different source files and combining the extracted data in one or more output files. For example, an output presentation that is a website can include one or more output files that include web pages of the website. Each web page may include HTML code generated based on layout data extracted from a layout file or other template file and content data extracted from a data source. An output presentation may or may not include tags or other metadata delineating or otherwise identifying the source files corresponding to each output element in the output presentation.

The editor application can provide in-context editing of source files, such as template files or content from a data source, via a preview of a web page or other output presentation rendered by a browser application or other viewer application for rendering an output presentation. A web page in context can include displaying a web page as rendered at a computing device, i.e., both the various templates that control the style of the web page or other static content as well as any dynamic content generated by accessing data from a database or other data source. The editor application can provide an editing interface for modifying the output presentation as displayed in a viewing application, such as a web page as displayed in a browser application. The editor application can identify a required modification to the underlying source code required to perform the corresponding modification in a source file. In response to receiving the modification of an output element, the editor application can apply the modification to the at least one source element in the at least one source files. For example, input may be received via the editing interface that re-positions an area of a web page used for displaying text to a different position on the web page. The editor application 114 can determine one or more portions of source code corresponding to the position of the text element in the web page. The editor application can determine how to modify the source code of the source files for the web page to correspond to the movement of the text element. The editor application can apply the modification to the source file. The editing interface can thus display a web page with live data and can be configured to allow editing of the live data within the same application. For example, the editor application can allow for the selection and modification of any element on a rendered web page and apply the modification to a database from which the rendered web page is generated. The editor application can thus allow for real-time feedback on dynamic content changes across all web pages affected by the modification.

The editor application can reduce the need for specialized knowledge of web development tools when modifying a layout of a web site. For example, a graphics designer without knowledge of web development tools (e.g., HTML) may modify the layout of a website without repeating any subsequent steps. The editor application can provide an interface for modifying a web page layout. The graphics designer can modify a layout of a web page by modifying the position of elements in the web page, modifying colors in the web page, etc. The editor application can correlate or otherwise associate the modifications of the output elements to corresponding modifications of source elements of a source file. The editor application can cause the source files to be modified accordingly. The graphics designer can thus modify a template file or other source file specifying a layout of the website via the editor application without accessing the source file via a web development tool requiring knowledge of HTML or other web development tools.

The editor application can detect any kind of editable behavior based on determining information about source templates from automatic pattern detection. For example, the source file of a <link> tag can be detected and replaced in order to change the cascading style sheet file for a web site file used on a page. The editor application can also identify multiple templates used to generate a web page or other output presentation. The editor application can select a specific template from the multiple templates that is used to generate a <link> tag.

As used herein, the term "cascading style sheet ("CSS") file" is used to refer to a file including one or more rules and/or selectors specifying an appearance of a rendered HTML page. The appearance of a web page can be modified by modifying the associated CSS file. For example, an editor application can modify one or more settings specified by the CSS file and detect what HTML elements are affected by modifications to the settings.

In additional or alternative embodiments, the editor application can determine that multiple output elements in the output presentation correspond to a common source element. The editor application can modify automatically each of the output elements in the same manner. For example, the editor application can modify content displayed in a first region of a web page, such as a sidebar region displaying a list of novels. The editor application can determine that the content corresponds to a record in a database. The editor application can also determine that the content displayed in a second region of a web page, such as a region displaying details about a selected novel, corresponds to the same record in a database. The editor application can apply a modification to the content in the first region, such as a change to the title of a novel in the sidebar region, to the content in the second region.

The editing application can use any suitable process or technique to determine that a repeated element in a web page or other output presentation corresponds to the same record in a data source and/or the same feature specified by a template file. The editing application can be used to modify multiple types of editable content, such as data from one or more data sources, data coming from one or more template files, style information (e.g., CSS styling), etc. The editing application can modify data from a data source by using a recorded link to the database to apply modifications to all instances of the same link in a web page. The editing application can modify data from a template file by recording the start and end offset in the template file that generated the output. All items in a web page that share same offsets can be updated accordingly. The editing application can modify style information by modifying a CSS styling rule that is applied on multiple elements of a web page. A CSS system can be used to detect all the elements that share the same property rules. In some embodiments, data for a web page may be computed on the server side based on multiple factors. For example, a web page may include a "date of birth" for a user at one segment of the web page and include a number of users over the age of 21 on a different segment of the web page. The editor application can record links to input data for any generated data such that any change of a record used to generate the data would trigger an update of the generated data.

Figure 1:
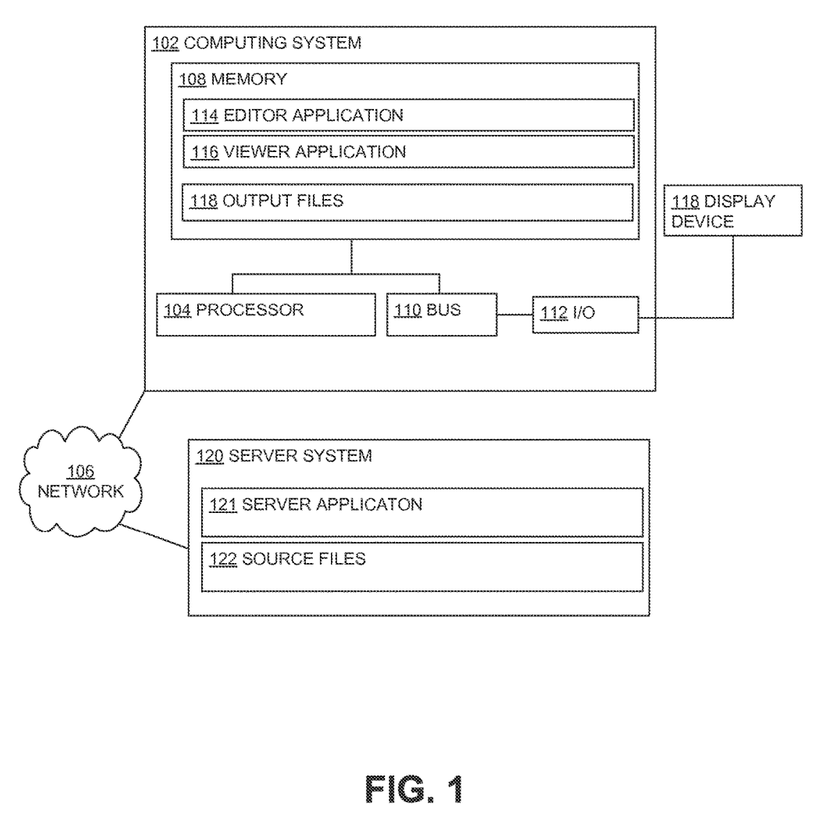
FIG. 1 is a block diagram depicting an example computing system for implementing certain embodiments.

Referring now to the drawings, FIG. 1 is a block diagram depicting an example computing system 102 for implementing certain embodiments.

The computing system 102 includes a processor 104 that is communicatively coupled to a memory 108 and that executes computer-executable program instructions and/or accesses information stored in the memory 108. The processor 104 may comprise a microprocessor, an application-specific integrated circuit ("ASIC"), a state machine, or other processing device. The processor 104 can include any of a number of computer processing devices, including one. Such a processor can include or may be in communication with a computer-readable medium storing instructions that, when executed by the processor 104, cause the processor to perform the steps described herein.

The computing system 102 may also comprise a number of external or internal devices such as input or output devices. For example, the computing system 102 is shown with an input/output ("I/O") interface 112, a display device 118, and an imaging device 120. A bus 110 can also be included in the computing system 102. The bus 110 can communicatively couple one or more components of the computing system 102.

A viewer application 116 stored in the memory 108 can configure the processor 104 to access, render, or otherwise use output files 118 for display at the display device 118. The output files 118 can include one or more files that can be rendered by a viewer application to provide an output presentation. For example, the viewer application 116 may be an Internet browser application configured to render output files, such as an HTML file and a CSS file, as an output presentation, such as a web page. The output files 118 may be resident in any suitable computer-readable medium and execute on any suitable processor. In one embodiment, the output files 118 can reside in the memory 108 at the computing system 102. In another embodiment, the output files 118 can be accessed by the computing system 102 from a remote content provider via a data network.

An editor application 114, such as a web development application or other suitable application, can be stored in the memory 108 and can configure the processor 104 to analyze, modify, or otherwise use the output files 118 for display at the display device 118, as described in detail below with respect to subsequent figures. Although the editor application 114 is depicted as a single application in FIG. 1, other implementations are possible. In some embodiments, the editor application 114 can include multiple software modules, such as a first module configured for parsing an HTML file for a web page and a second module configured for parsing a CSS file for a web page.

Although the editor application 114 and the viewer application 116 are depicted as independent applications in FIG. 1, other implementations are possible. In some embodiments, the editor application 114 can be a software module included in or accessible by a separate viewer application 114 executed by the processor 104 that is configured to modify, access, or otherwise use the output files 118.

A computer-readable medium may comprise, but is not limited to, electronic, optical, magnetic, or other storage device capable of providing a processor with computer-readable instructions or other program code. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The computing system 102 can include any suitable computing device for executing the editor application 114. Non-limiting examples of a computing device include a desktop computer, a tablet computer, or any other computing device suitable for rendering the output files 118.

The computing system 102 can receive or otherwise access, via a data network 106, one or more output files 118 generated by using at least one source element from at least one source files 122. The output files 118 can be generated by a server application 121 from one or more source files 118. Non-limiting examples of source files 122 include template files and data sources. A template file may include an HTML file or CSS file defining the appearance, functionality, and/or static content of the website. A data source may include a database or other suitable data source of dynamically generated content for a website. A non-limiting example of a server application 121 is a web server application. The server system 120 can include any suitable computing system for hosting the source files 118. In one embodiment, the server system 120 may be a single computing system. In another embodiment, the server system 120 may be a virtual server implemented using a number of computing systems connected in a grid or cloud computing topology.

Figure 2:
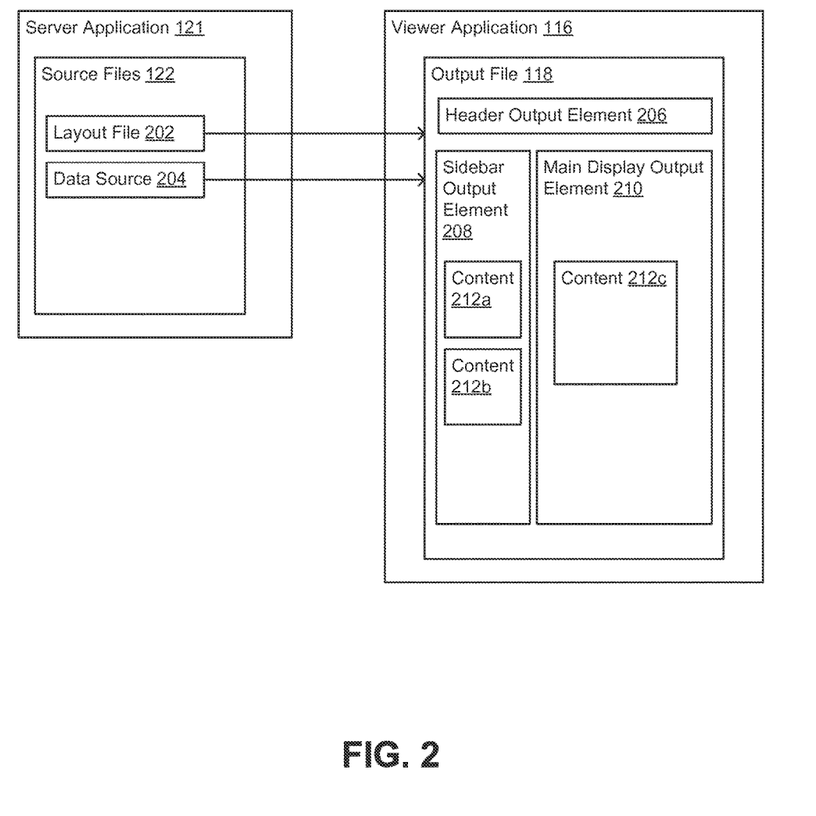
FIG. 2 is a modeling diagram depicting a server application generating an output file from one or more source files.

FIG. 2 is a modeling diagram depicting a server application 121 generating an output file 118 from one or more source files 122. The source files 122 can include a layout file 202 and a data source 204. The server application 121 can access content data from a data source 204. For example, a server application 121 can select a record from a data source 204 that is a database. The server application 121 can generate an output file 118 that includes some or all of the content data from the database. The server application 121 can organize the content data for display in an output file 118 based on the layout file 202.

The server application 121 can generate an output file 118 having one or more output elements, such as, for example, a header output element 206, a sidebar output element 208, and a main display output element 210. The header output element 206 can include, for example, a title for each page of a web site. The main display output element 210 can be used to display the main content for a web page, such as the content 212c extracted from the data source 204. A sidebar output element 208 can include a smaller display area for displaying auxiliary or other content data, such as the content 212a, 212b extracted from the data source 204.

The output file 118 may not include tags or other metadata identifying the source files 122 from which the output file is generated. For example, although the output file 118 includes content 212a-c from a data source 204 and organized as specified by a layout file 202, the output file 118 may not include any data identifying either the layout file 202 or the data source 204. The viewer application 116 that receives the output file 118 can render the HTML code of the output file 118 for display but may not be able to determine the identity or nature of the source files 122 from tags or other metadata in the output file 118.

Figure 3:
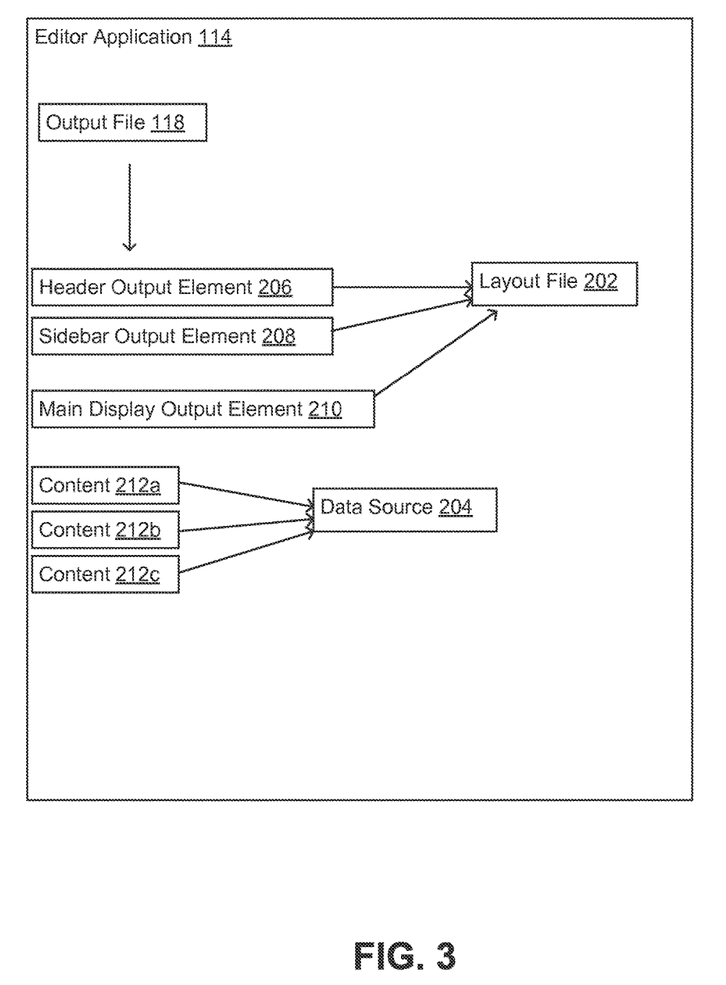
FIG. 3 is a modeling diagram depicting an editor application analyzing an output file of an output presentation to determine one or more patterns indicative of source files from which the output file is generated.

An editor application, such as the editor application 114 depicted in FIG. 1, can "reverse-engineer" the nature and/or identity of the source files 122 by analyzing the output file 118. For example, FIG. 3 is a modeling diagram depicting an editor application analyzing an output file 118 of an output presentation to determine one or more patterns indicative of source files 122 from which the output file 118 is generated.

The editor application 114 analyzes elements of one or more output files 118, such as the HTML of a web page, to identify one or more corresponding source elements in source files 122.

The editor application 114 can determine which elements of an output file 118 correspond to respective elements of a layout file 202, a data source 204, or other source file 122. The editor application 114 analyzes output elements in the one or more output files 118 to identify at least one pattern among the output elements. The editor application 114 identifies the source elements based on the identified pattern(s). For example, as depicted in FIG. 3, the editor application 114 can analyze the output file 118. The editor application 114 can identify patterns in one or more of the header output element 206, the sidebar output element 208, the main display output element 210, and/or the content 212a-c. Based on the patterns, the editor application 114 can determine that the header output element 206, the sidebar output element 208, and the main display output element 210 correspond to a layout file such as the layout file 202. Based on the patterns, the editor application 114 can also determine that the content 212a-c corresponds to a data source such as the data source 204.

A non-limiting example of the analysis of an output file 118 that is a web page is provided below. A template file or other layout file for a web page may include the following code:

```
{% for article in articles %}
<h1>{{article.title}}</h1>
<p>{{article.author}}</p>
<a href="{{article.link}}">Click here to read more</a>
{% endfor %}
```

The template file references an "articles" module to read data from a data source, such as an external database in which articles are stored. HTML elements for titles and authors of respective articles are generated by the references in the template to "article.title" and "article.author."

An example of an output element generated using the template may include the following code:

```
<h1>Moving towards better support</h1>
<p>John Snuffy</p>
<a href="/moving_towards_better_support">Click here to read more</a>
```

In the source code fragment above, content delineated by the <h1> tag can be editable. Changes to the content can be saved to the "title" field of the first "article" record from the "articles" module. Content delineated by the <p> tag can be editable. Changes to the content can be saved to the "author" field of the first "article" record from the "articles" module. For the <a> tag, the "href" attribute can be saved to the database. The content can be saved to the template file.

The editor application 114 can provide an interface for modifying the header output element 206, the sidebar output element 208, the main display output element 210, and/or the content 212a-c and causing corresponding modifications to the source files 122. The editor application 114 can receive data describing a modification to one or more of the output elements in the one or more output files 118. The editor application 114 can identify a required modification to the underlying source code required to generate a corresponding modification in one of the source code files 122. In response to receiving the modification of an output element, the editor application 114 can apply the modification to the at least one source element in the at least one source files 122.

The editor application 114 may thereby allow a modification to an output element of one or more output files 118 to be applied to a corresponding source element provided by one or more source files 122.

In some embodiments, pattern recognition can be performed by the server application 121 executed on the server system 120 before a web page is provided to the editor application 114 at the computing system 102. For example, the server application 121 can record all detected behaviors for a web page in a data structure such as (but not limited to) a JavaScript Object Notation ("JSON") data structure. Behaviors can be attached to Document Object Model ("DOM") elements and can have a link to an element in the page. A link can be include any suitable reference, such as an identifier that the DOM element includes (e.g., an "ID" attribute from HTML) or an injected attribute. The server application 121 can control generated output and augment the generated output data with tracking information usable by the editor application 114 at the computing system 102.

For example, the editor application 114 can detect editable content in a template file, such as "<a href='#new_section'>Click here</a>." The editor application 114 can add a new uniquely generated identifier on the "<a>" tag and reference the identifier from the JSON structure. A non-limiting example of a JSON structure is:

```
{
    "behaviors": [
        {
            "link": "#a_1",
            "type": "editableContent",
            "contentSourceFile": [[name of the template file]],
            "contentStart": [[offset of the "Click here" text in the template file]],
            "contentEnd": [[offset of the last letter of the "Click here" text in the template file]]
        },
        {
            "link": "#a_1",
            "type": "editableAttribute",
            "attributeName": "href",
            "contentSourceFile": [[name of the template file]],
            "contentStart": [[offset of the "#new_section" text in the template file]],
            "contentEnd": [[offset of the last letter of the "#new_section" text in the template file]]
        }
    ]
}
```

An example of the generated output can be: <a id="a_1" href="new_section">Click here</a>.

The editor application 114 can augment output elements with behaviors. Examples of such behaviors include features for "editable content" or "editable attribute." The editor application 114 can track changes in the HTML elements. The editor application can apply the changes to their original source template file or external database used to generate the web page.

The editor application 114 can access a web page. One or more authentication processes (e.g., via a cookie or a token) can be used to verify that the web page can be edited using the editor application 114. The editor application 114 may edit the web page or other one or more output files 118. For example, in response to an input selecting a browser element, such as textual elements, the editor application 114 can modify text. In some embodiments, the editor application 114 can apply one or more visual indicators to content that may be modified. For example, the editor application 114 can highlight all editable content.

The editor application 114 can thus modify one or more output files 118 and a corresponding one or more source files 122 transparently. Transparently modifying source files 122 can include modifying the source files 122 by modifying a corresponding one or more output files 118 without using metadata in the one or more output files 118 specifically identifying the source files 122.

For a "what you see is what you get" ("WYSIWYG") editing interface, some or all of the output elements of an output file may refer to a common record of a data source. For example, HTML elements on a web page may include the same content generated by accessing the data source 204. The editor application 114 can cause all output elements referencing the same edited content to be updated in real-time in response.

In one example, an "articles" database may have multiple records. An <a> tag may be generated from a repetitive zone in the original template file. An instance of "Click here to read more" can be updated in response to a development application modifying the content of a <a> tag element. In another example, an external database includes multiple records to be modified. The content 212a, 212b displayed in a sidebar output element 208 in an output file 118 such as a web page may display summary information about each of the articles in the external database. A main content area of a web page may display detailed information about a specific article. Changing the title of an article displayed in the main content area can cause the title of the article to be updated in the sidebar area displaying summary information, such as a list of articles.

A layout of for an output presentation such as a web page can be controlled by a source file such as a CSS file. For example, a CSS file may specify a grid-based layout for organizing the content of a web page. A grid-based layout can allow various objects in a web page layout to be properly aligned. For example, a designer may divide a layout into two horizontal sections, such as a sidebar and a section for displaying the main content of a web page. The editor application 114 can automatically detect which elements in a web page have an appearance that are specified by a grid-based layout of a CSS file or other source file. The editor application can allow workflows such as creating a new column or resizing and moving a column.

A web page may use layouts such as, for example, a two-column layout having a sidebar area and main content area or a three-column layout having main content in the middle columns and other content in two narrower outer columns.

The editor application 114 can automatically detect the columns and the source files used to generate the columns. The editor application 114 can provide an interface with commands for moving and/or re-sizing columns, such as by "dragging and dropping" a given column to different positions on a web page. The editor application 114 can determine a modification to a source file corresponding to the modification to the web page. For example, the editor application 114 determines that changing a position of a column on the rendered web corresponds to modifying source code of a layout file specifying the positions of the columns.

In a non-limiting example, the editor application 114 can use CSS class names to define the layout and size of the columns. For example, the following code can be provide a grid-based layout:

```
<div class="row"> <!-- this will be a row in the grid -->
    <div class="column-of-size-2"></div>
    <div class="column-of-size-10"></div>
</div>
```

The editor application 114 can detect that the first row include two columns. The editor application 114 can resize the grid by updating the class names in the original template file. The editor application 114 can rearrange the columns by moving the <div> elements within the code and updating the class names. The editor application 114 can identify the source template file including the code and the start and end offsets of the elements inside the template file. The editor application 114 can apply the change to the source template file.

In some embodiments, multiple class names can be included in a grid-based layout for a web page. For example, some grid-systems allow empty space to be added between columns. Such visual elements can be implemented by adding either more class-names on the columns or more DOM elements between columns. The editor application 114 can compute the model of the grid and automatically detect usage cases, such as the movement of a column from the right side. The moved column may not require empty space on the left. The editor application 114 can use the space from the column from the right to the column moved to the right.

Figure 4:
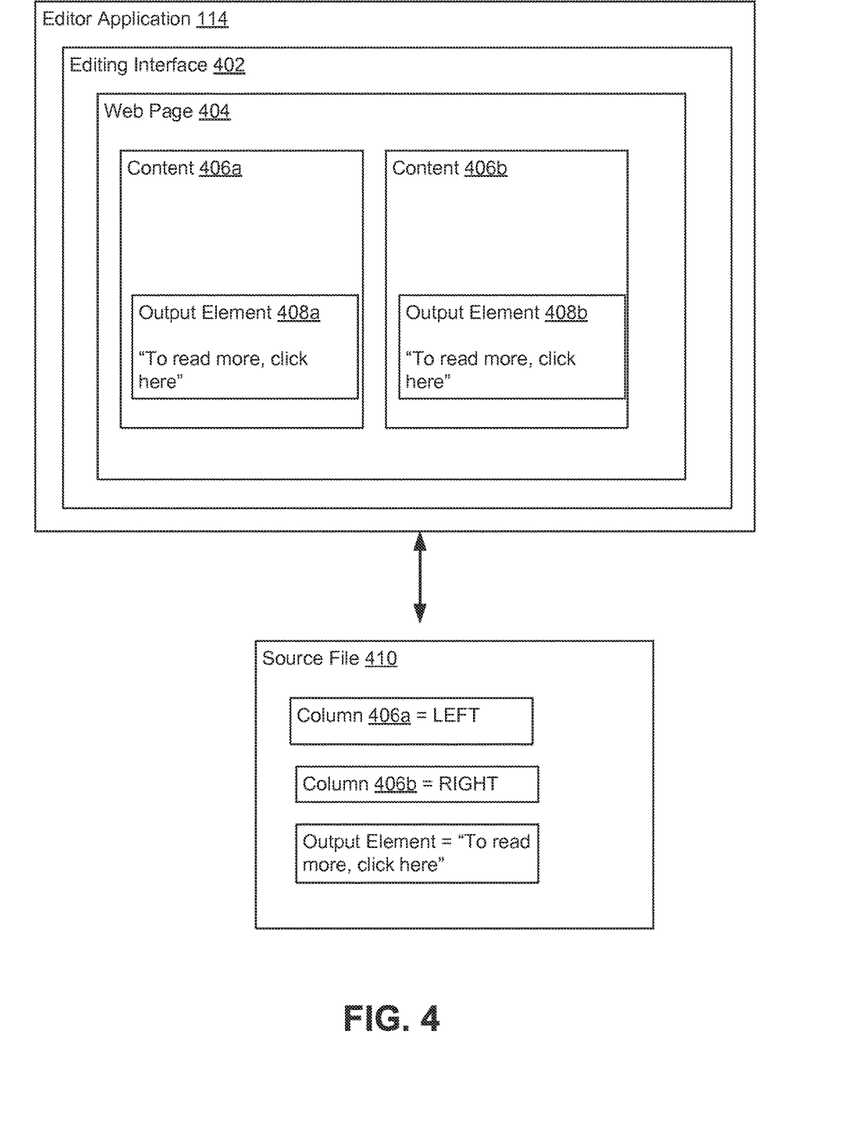
FIG. 4 is a modeling diagram depicting modification of an output file such as a web page via an editing interface provided by an editor application.
Figure 5:
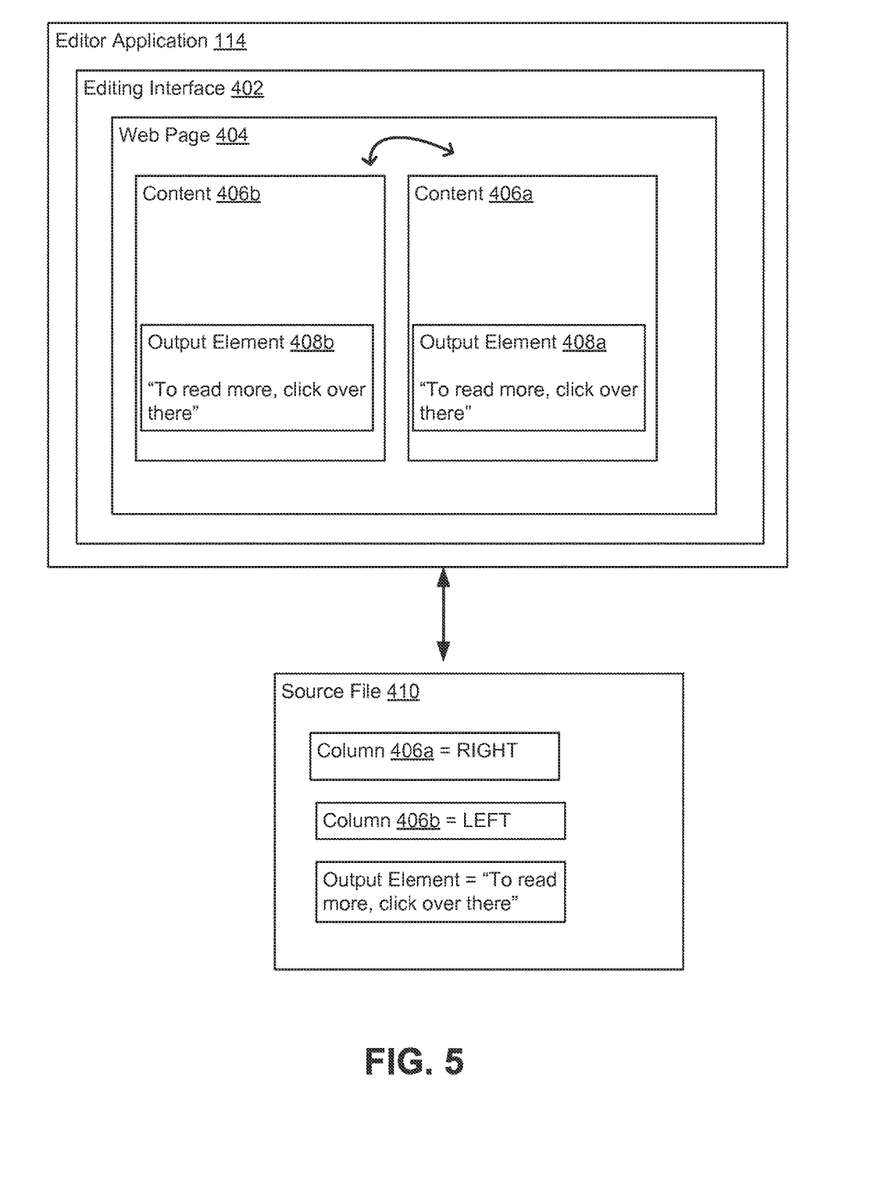
FIG. 5 is a modeling diagram depicting modification of an output file such as a web page via an editing interface provided by an editor application.

FIGS. 4-5 are modeling diagrams depicting modification of an output file such as a web page 404 via an editing interface 402 provided by an editor application 114.

The editor application 114 can determine that a first column is used to display content 406a and a second column is used to display content 406b. Based on determining that those two columns are used to display content in the web page 404, the editor application 114 can associate one or more modifications to the columns in the web page with modifications to a source file, such as a layout file 202 or other template file, specifying a layout that includes the columns. In some embodiments, the editor application 114 can access the source file via a data network. The editor application 114 can directly modify the source file. In other embodiments, the editor application 114 can transmit data describing the modification to a server system from which the source file is hosted. An application executed at the server system can modify the source file.

To modify the position of a column 406a, a region to be moved is selected via input received to the editing interface 402. The position of column 406a can be moved to the other side of column 406b, as depicted in FIG. 5. In response to the column being moved to a new position (e.g. "dropped"), the editor application 114 can generate an animation in the editing interface 402 to switch the position of the columns. The editor application 114 can automatically update the source template file. The editor application can cause class-names used by the other columns to be updated in their respective source files to accommodate the new space.

The editing interface 402 can also be used to modify column widths in a gird-based layout. To modify a column width, a column to be resized is selected via input to the editing interface 402. A resize handler of the column is dragged in a given direction.

In another example, new sections can be added to a web page by dragging and dropping from a palette of predefined templates provided in the editing interface 402. A template providing the new section can be modified by the editor application as described above.

In another example, an appearance of a web page can be modified to use a customized theme. A font name, size, or color can be selected from a contextual menu. Input can be received to the editing interface 402 selecting the element to be changed. The font name, size or color can be selected from a contextual property dialog in the editing interface 402.

In another example, the editor application can allow modification to a data source 204 by modifying the content displayed in an output file 118. The editor application 114 can identify sections of the output presentation generated from different template files. The editor application can provide an in-context editing interface for modifying the source template files.

For example, as depicted in FIG. 4, the "read more" link may be modified via the editing interface 402. The editor application 114 automatically detects that the same "read more" link was generated for multiple output elements 408a, 408b of the web page 404. The editor application 114 can automatically modify each of the "read more" links in the multiple output elements 408a, 408b of the web page such that the various instances are in sync with one another. For example, the text displayed in the output elements 408a, 408b may be controlled by the value of "Output element" in source file 410. Modifying the output element 408a to display, "To read more, click over there" can cause both the source file 410 to be modified such that the value for "output element" is "To read more, click over there" and the web page 404 to be modified such that the output element 408b displays "To read more, click over there."

Figure 6:
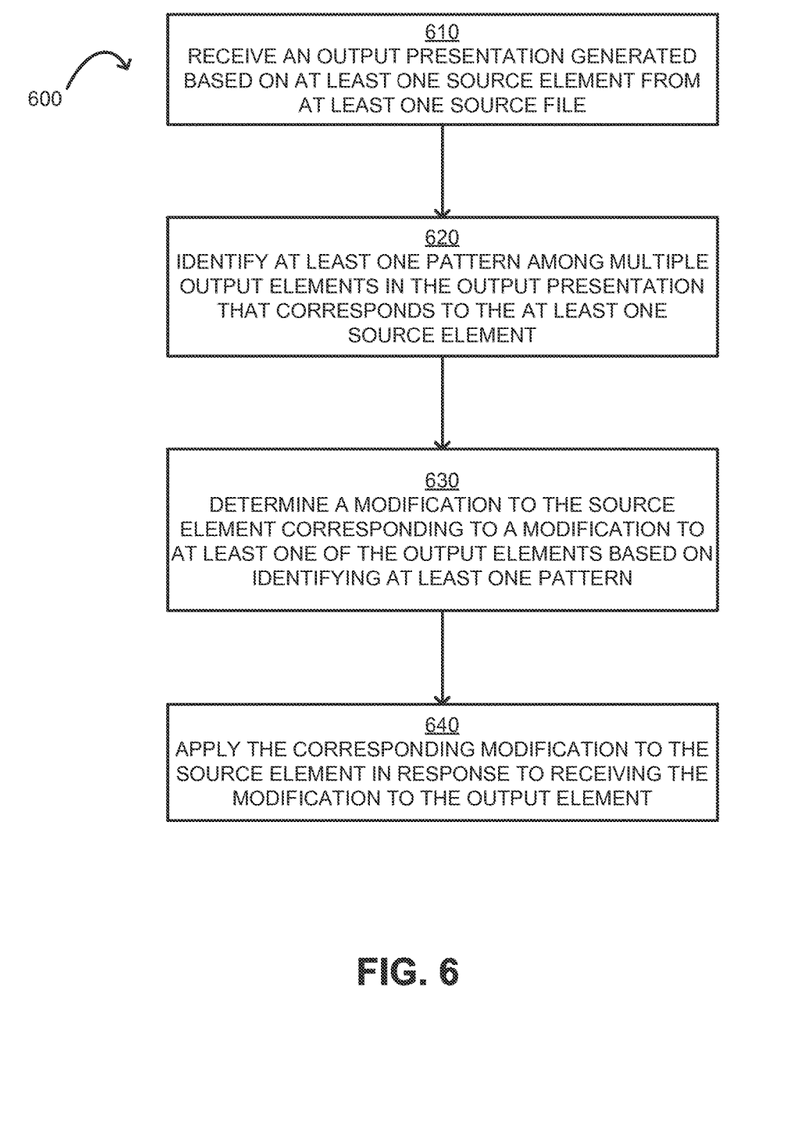
FIG. 6 is a flow chart illustrating an example method for in-context editing of websites and other output presentations via automatic pattern detection.

FIG. 6 is a flow chart illustrating an example method 600 for in-context editing of websites and other output presentations via automatic pattern detection. For illustrative purposes, the method 600 is described with reference to the system implementation depicted in FIG. 1. Other implementations, however, are possible.

The method 600 involves receiving an output presentation, as shown in block 610. The output presentation can include one or more output files 118 generated based on at least one source element from at least one source file 122. The processor 104 of the computing system 102 can execute the editor application 114 to receive or otherwise access the output presentation.

The method 600 further involves identifying at least one pattern among multiple output elements in the output presentation, as shown in block 620. The at least one pattern corresponds to the at least one source element. The processor 104 of the computing system 102 can execute the editor application 114 to automatically identify patterns in an output file 118, as described above with respect to FIGS. 3-5.

The method 600 further involves determining, based on identifying at least one pattern, a modification to the source element corresponding to a modification to at least one of the output elements, as shown in block 630. The processor 104 of the computing system 102 can execute the editor application 114 to determine modifications to a source file 122 corresponding to respective modifications of an output file 118, as described above with respect to FIGS. 3-5.

The method 600 further involves applying the corresponding modification to the at least one source element in response to receiving the modification to at least one of the output elements, as shown in block 640. The processor 104 of the computing system 102 can execute the editor application 114 to apply the corresponding modification to the at least one source element in a source file. In some embodiments, the editor application 114 can access one or more source files 122 via the data network 106. The editor application 114 can modify the one or more source files 122. In some embodiments, the editor application 114 can transit data describing the modifications to a server application 121 via the data network 106. The server application 121 can modify the one or more source files 122 as described by the editor application 114.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method comprising:
receiving, by an editor application executed by a processing device, an output presentation, the output presentation generated based on a source element from a source file;
identifying, by the editor application, a pattern in a visual presentation of a plurality of output elements as displayed in the received output presentation, wherein the pattern corresponds to the source element;
receiving, by the editor application, a modification to an output element from the plurality of output elements in the received output presentation;
based on identifying the pattern, determining, by the editor application, a corresponding modification to the source element that corresponds to the modification to the output element; and
responsive to receiving the modification to the of the plurality of output elements, applying, by the editor application, the corresponding modification to the source element.

2. The method of claim of claim 1,
wherein the output presentation comprises a web page;
wherein identifying the pattern comprises identifying a layout of the plurality of output elements;
wherein determining the modification to the source element corresponding to the modification to the of the plurality of output elements comprises determining a modification to one or more elements of a template file specifying the layout.

3. The method of claim 2, wherein the modification to the output element comprises a modification of a position of the output element.

4. The method of claim 1,
wherein the output presentation comprises a web page;
wherein identifying the pattern comprises identifying that the plurality of output elements comprise data from a database;
wherein determining the modification to the source element corresponding to a modification to the of the plurality of output elements comprises determining a modification to the data stored in the database.

5. The method of claim 4, further comprising:
determining, by the editor application, that the output element and an additional output element of the plurality of output elements correspond to a common record of the database; and
applying, by the editor application, a modification to the additional output element that includes part of the modification to the output element.

6. The method of claim 4, wherein the pattern is identified and the modification to the source element is determined independently from analyzing metadata identifying the source element from the source file.

7. The method of claim 1, further comprising providing, by the editor application, an editing interface for receiving the modification to the of the plurality of output elements, wherein the editing interface includes the output presentation having live data.

8. The method of claim 1, wherein determining the corresponding modification to the source element that corresponds to the modification to the output element comprises:

determining a position of the output element as displayed in the received output presentation;

determining that the source element specifies a corresponding position that corresponds to the determined position of the output element; and matching the plurality of output elements to the source element based on the source element specifying the corresponding position, wherein applying the corresponding modification to the source element comprises updating the specified position in the source element based on a modification in the position of the output element.

9. The method of claim 8, wherein the position of the output element is a start and end offset of the output element and the source element indicates the start and end offset.

10. The method of claim 1, wherein determining the corresponding modification to the source element that corresponds to the modification to the output element comprises identifying the source element by performing operations comprising:

identifying, in the output presentation, a user identifier for a user;

determining that the user identifier was used to access the source element from which the output presentation was generated; and determining that the accessed source element is usable for generating the plurality of output elements having the identified pattern.

11. A non-transitory computer-readable medium embodying program code executable by a processing device, the non-transitory computer-readable medium comprising:

program code for receiving an output presentation, the output presentation generated based on a source element from a source file;

program code for identifying a pattern in a visual presentation of a plurality of output elements as displayed in the received output presentation, wherein the pattern corresponds to the source element;

program code for receiving a modification to an output element from the plurality of output elements in the received output presentation;

program code for determining, based on identifying the pattern, a corresponding modification to the source element that corresponds to the modification to the output element; and program code for applying, based on identifying the pattern, the corresponding modification to the source element in response to receiving the modification to the of the plurality of output elements.

12. The non-transitory computer-readable medium claim 11, wherein the output presentation comprises a web page;

wherein identifying the pattern comprises identifying a layout of the plurality of output elements;

wherein determining the modification to the source element corresponding to the modification to the of the plurality of output elements comprises determining a modification to one or more elements of a template file specifying the layout.

13. The non-transitory computer-readable medium of claim 12, wherein the modification to the output element comprises a modification of a position of the output element.

14. The non-transitory computer-readable medium of claim 11, wherein the output presentation comprises a web page;

wherein identifying the pattern comprises identifying that the plurality of output elements comprise data from a database;

wherein determining the modification to the source element corresponding to a modification to the of the plurality of output elements comprises determining a modification to the data stored in the database.

15. A system comprising:

a processor configured to execute instructions stored in a non-transitory computer-readable medium;

wherein the instructions comprise an editor application configured to perform operations comprising:

identifying a pattern in a visual presentation of a plurality of output elements as displayed in the received output presentation, wherein the pattern corresponds to the source element;

receiving a modification to an output element from the plurality of output elements in the received output presentation;

determining, based on identifying the pattern, a corresponding modification to the source element that corresponds to the modification to the output element; and based on identifying the pattern, applying the corresponding modification to the source element in response to receiving the modification to the of the plurality of output elements.

16. The system of claim 15, wherein the output presentation comprises a web page;

wherein identifying the pattern comprises identifying a layout of the plurality of output elements;

wherein determining the modification to the source element corresponding to the modification to the of the plurality of output elements comprises determining a modification to one or more elements of a template file specifying the layout.

17. The system of claim 16, wherein the modification to the output element comprises a modification of a position of the output element.

18. The system of claim 15, wherein the output presentation comprises a web page;

wherein identifying the pattern comprises identifying that the plurality of output elements comprise data from a database;

wherein determining the modification to the source element corresponding to a modification to the of the plurality of output elements comprises determining a modification to the data stored in the database.

19. The system of claim 18, further comprising:

program code for determining that the output element and an additional output element of the plurality of output elements correspond to a common record of the database; and program code for applying a modification to the additional output element that includes at least part of the modification to the output element.

20. The system of claim 15, wherein the pattern is identified and the modification to the source element is determined independently from analyzing metadata identifying the source element from the source file.

* * * * *